United States Patent
Scaggs

[19]

[11] Patent Number: 6,081,542
[45] Date of Patent: Jun. 27, 2000

[54] OPTICALLY PUMPED LASER WITH MULTI-FACET GAIN MEDIUM

[75] Inventor: Michael J. Scaggs, Weston, Fla.

[73] Assignee: Lambda Physik GmbH, Gottingen, Germany

[21] Appl. No.: 09/096,591

[22] Filed: Jun. 12, 1998

[51] Int. Cl.[7] .............................. H01S 3/091; H01S 3/092
[52] U.S. Cl. ................ 372/70; 372/99; 372/100
[58] Field of Search .............................. 372/70, 99, 100

[56] References Cited

U.S. PATENT DOCUMENTS

| | | | |
|---|---|---|---|
| Re. 34,729 | 9/1994 | Sipes, Jr. ..................................... | 372/75 |
| 5,052,815 | 10/1991 | Nightingale et al. ...................... | 372/94 |
| 5,148,441 | 9/1992 | Itai .............................................. | 372/70 |
| 5,148,443 | 9/1992 | Du et al. ..................................... | 372/99 |
| 5,170,406 | 12/1992 | Tidwell ....................................... | 372/71 |
| 5,289,493 | 2/1994 | Fink ........................................... | 372/100 |
| 5,321,718 | 6/1994 | Waarts et al. .............................. | 372/99 |
| 5,513,205 | 4/1996 | Roubinstein ............................... | 372/99 |
| 5,610,936 | 3/1997 | Cantoni ...................................... | 372/99 |
| 5,675,594 | 10/1997 | Hovis et al. ................................ | 372/99 |
| 5,684,812 | 11/1997 | Shih ............................................ | 372/99 |
| 5,963,574 | 10/1999 | Gregor et al. .............................. | 372/99 |

FOREIGN PATENT DOCUMENTS

| | | |
|---|---|---|
| 0 355 566 | 2/1990 | European Pat. Off. . |
| WO 90/12435 | 10/1990 | WIPO . |

OTHER PUBLICATIONS

Coyle, D. Barry for the Goddard Space Flight Center, "Alternating–Precessive–Slab Laser Preamplifier", NASA Tech Briefs, Jul. 1997, pp. 52–53.

Coyle, D. Barry, "Design Of A High–Gain Laser Diode–Array Pumped Nd:YAG Alternating Precessive Slab Amplifier", Dept. Of Physics, The American University, Washington, D.C., Jul., 1997, pp. 1–14.

Clarkson, W.A. & Hanna, D.C., "Single Frequency Q–Switched Operation Of A Laser Dipole–Pumped, Nd–YAG Ring Laser", Optics Communications, vol. 73, No. 6, Nov. 15, 1989, pp. 469–474.

*Primary Examiner*—Teresa M. Arroyo
*Assistant Examiner*—Robert E. Wise
*Attorney, Agent, or Firm*—Limbach & Limbach L.L.P.

[57] ABSTRACT

A solid state laser system that includes a resonant cavity, a gain medium disposed the resonant cavity and a plurality of optical pump sources. The resonant cavity is defined by an output coupler, a high reflector, and a plurality of retro-reflecting optical elements. The gain medium has at least a first pair of facets that oppose each other and a second pair of facets that oppose each other, so as to form a shape such as a cube or hexagon. The plurality of optical pump sources each produce an optical pump output that is incident upon one of the facets for exciting the gain medium to generate an intracavity light beam that oscillates in the resonant cavity. The resonant cavity and gain medium are oriented so that, during a single trip through the resonant cavity, the beam makes a plurality of passes through the gain medium. During one pass, the beam passes directly through the gain medium by entering and exiting the gain medium through the first pair of facets. During another pass, the beam passes non-directly through the gain medium by entering the gain medium through one of the facets, totally internally reflecting off a non-opposing facet to the one facet, and exiting the gain medium through an opposing facet to the one facet. The angle of incidence for all beam segments entering or exiting the gain medium is 45 degrees to the corresponding facet. All beam segments outside of the gain medium are either parallel or orthogonal to teach other.

37 Claims, 9 Drawing Sheets

OPTICALLY PUMPED LASER WITH MULTI-FACET GAIN MEDIUM

FIELD OF THE INVENTION

The present invention relates to solid state lasers, and more particularly to a laser system having a gain medium optically pumped by a plurality of optical sources.

BACKGROUND OF THE INVENTION

Many novel laser cavity designs have been developed for optically exciting a solid state gain medium to produce a laser cavity output beam. For example, in a side-pumped laser cavity design, one or more pump sources (e.g. flash lamps, laser diodes, etc.) are placed along the length of the gain medium. The gain medium is therefore optically pumped perpendicular to the direction of propagation of the intracavity laser beam. Thus, during a single round trip through the cavity, the laser beam passes through and is amplified by the gain medium once in a ring cavity configuration, or twice in a transverse cavity configuration. This geometry is advantageous because multiple pump sources can be positioned along the gain medium's length, thus increasing laser mode amplification. However, side-pumped laser cavity configurations suffer from low conversion efficiencies and low beam quality.

In an end-pumped laser cavity design, the output from the pump source is focused into the entry or exit face of the gain medium co-linearly with the intracavity laser beam. The gain medium is therefore optically pumped parallel to the direction of propagation of the intracavity laser beam. This design has good conversion efficiency and mode quality. However, end-pumped laser designs require special optical elements to separate the pump power radiation from the laser beam. Further, it is difficult to focus the output from a plurality of pump sources through the entry and exit faces of the gain medium, let alone maintain proper alignment.

The output power of end-pumped laser cavity designs has been increased by using special cavity or gain medium geometries that allow multiple pump sources to co-linearly excite the gain medium. U.S. Pat. No. 5,170,406 discloses placing a plurality of pump sources circumferentially about the gain medium optical axis with the pump beams directed into the end faces of the gain medium at relatively small multiplexing angles to the optical axis. U.S. Pat. No. Re 34,729 discloses dichroic mirrors on opposite sides of the gain medium through which multiple pump sources excite the gain medium. The beam travels through the gain medium in a zig-zag pattern between the dichroic mirrors, thus providing several optimal entry points for pump beams to optically pump the gain medium. U.S. Pat. No. 5,148,441 discloses arranging laser medium pellets to correspond to a zigzag reflected beam pattern.

The above described cavity geometries have several drawbacks. Specifically, these cavity designs are complex, are difficult to align and to maintain alignment, are exceedingly large, exhibit adverse thermal lensing, are difficult to reliably control the laser mode, require special optics to separate pump power from the laser beam, and are difficult to provide adequate cooling to the gain medium and all the pump sources.

There is a need for a simplified, easy to align solid state laser cavity that minimizes adverse thermal lensing, takes up minimal space, and provides adequate cooling for both the gain medium and all pump sources.

SUMMARY OF THE INVENTION

The present invention solves the aforementioned problems by providing a laser cavity design that is easy to align, takes up minimal space, and allows multiple pump sources to excite the gain medium without adverse thermal lensing.

The solid state laser system of the present invention includes a resonant cavity having a retro-reflecting optical element, a gain medium disposed in the resonant cavity, and a plurality of optical pump sources. The gain medium has at least a first and a second pair of opposing facets. The optical pump source each produce an optical pump output that is incident upon one of the facets for exciting the gain medium to amplify an intracavity light beam that travels through the resonant cavity. The resonant cavity and gain medium are oriented so that, during a single trip through the resonant cavity, the beam makes at least a first and a second pass through the gain medium. During the first pass, the beam enters and exits the gain medium through the first pair of opposing facets. During the second pass the beam enters and exits the gain medium through the second pair of opposing facets.

In another aspect of the present invention, the solid state laser system includes a resonant cavity, a gain medium disposed the resonant cavity and a plurality of optical pump sources. The resonant cavity is defined by an output coupler, a high reflector, and a plurality of retro-reflecting optical elements. The gain medium has at least a first pair of facets that oppose each other and a second pair of facets that oppose each other. The plurality of optical pump sources each produce an optical pump output that is incident upon one of the facets for exciting the gain medium to generate an intracavity light beam that oscillates in the resonant cavity. The resonant cavity and gain medium are oriented so that, during a single trip through the resonant cavity, the beam makes at least a first and a second pass through the gain medium. During the first pass, the beam passes directly through the gain medium by entering and exiting the gain medium through the first pair of facets. During the second pass, the beam passes non-directly through the gain medium by entering the gain medium through one of the facets, totally internally reflecting off a non-opposing facet to the one facet, and exiting the gain medium through an opposing facet to the one facet.

In yet another aspect of the present invention, the solid state laser system includes a resonant cavity, a gain medium disposed in the resonant cavity and a plurality of optical pump sources. The resonant cavity is defined by an output coupler, a high reflector, and at least a first, second and third retro-reflecting optical elements. The gain medium has at least a first and a second facets that oppose each other and a third and fourth facets that oppose each other. The plurality of optical pump sources each produce an optical pump output that is incident upon one of the first, second, third and fourth facets for optically exciting the gain medium to generate an intracavity light beam that oscillates in the resonant cavity. The resonant cavity and gain medium are oriented so that, during a single trip through the resonant cavity, the beam enters the gain medium through the first facet, exits the gain medium through the second facet, is re-directed by the first retro-reflecting optical element back toward the second facet, re-enters the gain medium through the second facet, totally internally reflects off of the third facet, exits the gain medium through the first facet, is re-directed toward the third facet by at least the second retro-reflecting optical element, re-enters the gain medium through the third facet, totally internally reflects off of the first facet, exits the gain medium through the fourth facet, is re-directed toward the fourth facet by the third retro-reflecting optical element, re-enters the gain medium through the fourth facet, and exits the gain medium through the third facet.

Other objects and features of the present invention will become apparent by a review of the specification, claims and appended figures.

DETAILED DESCRIPTION OF THE PREFERRED EMBODIMENTS

Figure 1A:
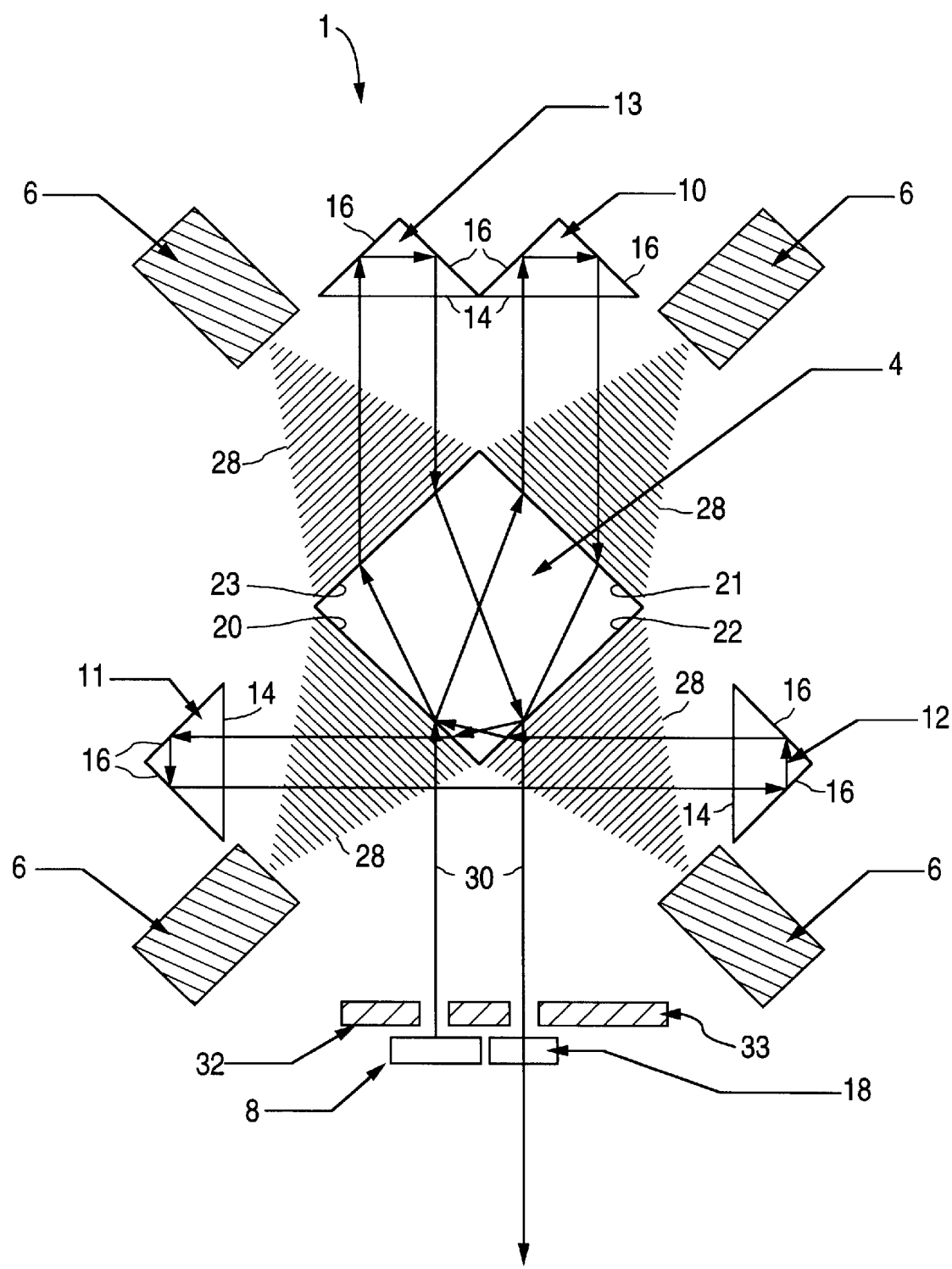
FIG. 1A is a top plan view of the solid state laser system of the present invention.
Figure 1B:
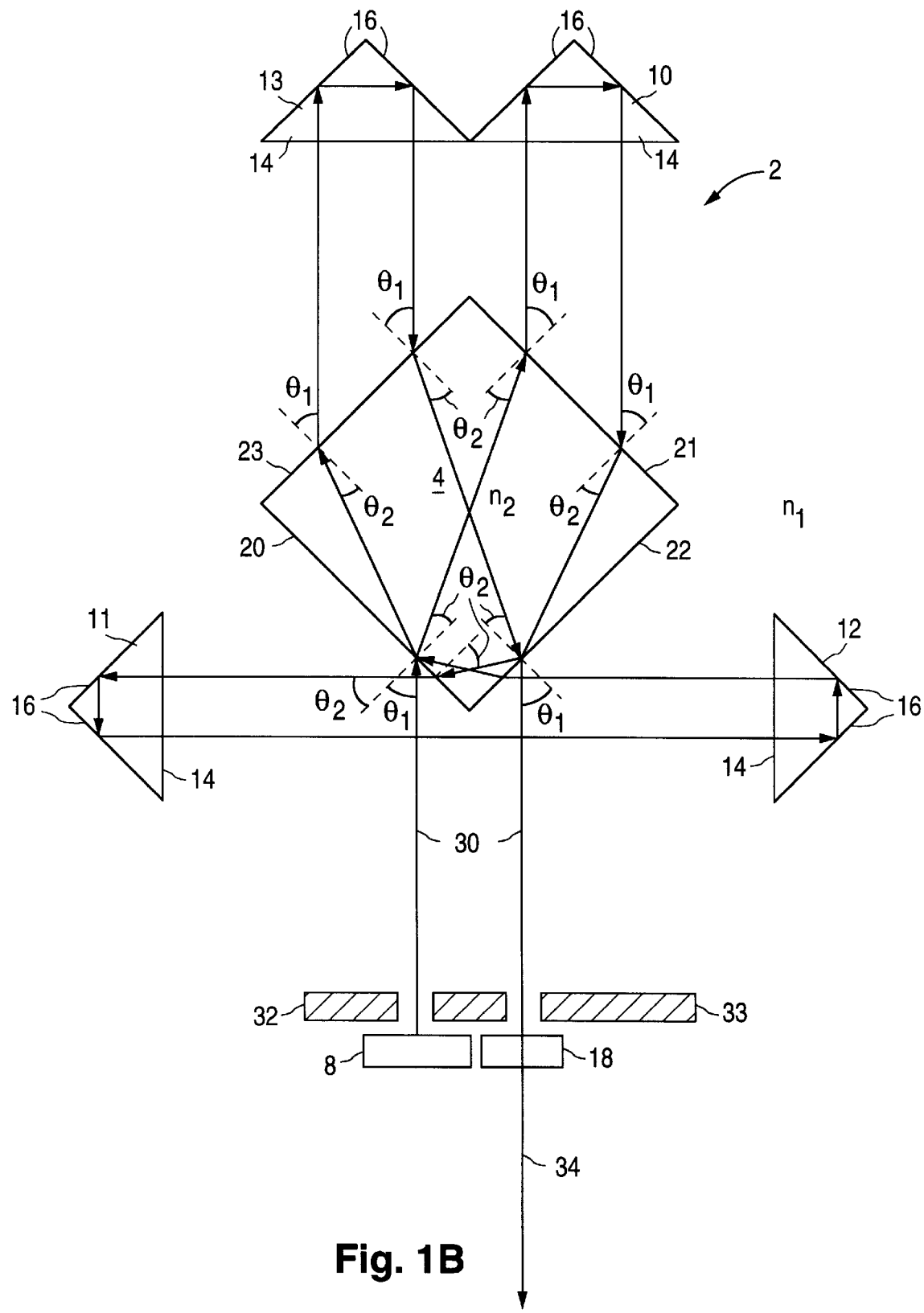
FIG. 1B is a top plan view of the resonant cavity and gain medium of the present invention.

The present invention is a solid state laser 1 that includes a resonant cavity 2, gain medium 4 and a plurality of optical pump sources 6, as illustrated in FIGS. 1A and 1B.

The resonant cavity 2 is a folded cavity that is defined by a highly reflective (HR) mirror 8, four rooftop (folding) prisms 10, 11, 12 and 13 and a partially reflecting (output coupling-OC) mirror 18. Rooftop prisms 10–13 each have an entry face 14, and two reflecting faces 16. Mirrors 8 and 18 define the ends of the resonant cavity.

The gain medium 4 is made of a laser cavity gain material, such as Nd:YAG or Nd:YLF, having a cube-shape. Alternately, gain medium 4 can be a cube shaped dye cell filled with laser dye. Cube shaped gain medium 4 has a square-shaped cross-section, with four facets (faces) 20, 21, 22 and 23 oriented with facet 20 and 21 opposing each other and facets 22 and 23 opposing each other.

Each optical pump source 6 produces an pump source output 28 that is directed to one of the facets 20–23. Optical pump sources 6 are preferably semiconductor laser diodes, but can also be flashlamps, or any suitable laser source for the active medium. Preferably, each pump source output 28 strikes the corresponding facet 20–23 at a substantially normal angle of incidence for minimum reflection loss and even gain medium illumination and excitation.

The gain medium 4 is centrally disposed in resonant cavity 2 and oriented such than any intracavity light beam incident upon one of the facets 20–23 passes through the gain medium and is refracted out thereof through another of the facets 20–23 in a direction either parallel or perpendicular to the incident beam. More specifically, mirrors 8 and 18 are positioned to oppose prisms 10 and 13 in one direction, with gain medium 4 disposed therebetween, and prism 11 is positioned to oppose prism 12 in a direction perpendicular to the one direction, with gain medium 4 disposed therebetween. Facets 20/22 face toward mirrors 8/18, facets 21/23 face toward prisms 10/13, facet 20 faces toward prism 11, and facet 22 faces toward prism 12.

In operation, the excited gain medium 4 generates an intracavity laser beam 30 that oscillates in the resonant cavity 2 and makes eight passes through gain medium during each roundtrip through the cavity (four passes during each single trip). The beam 30 follows an intracavity path, which is now described starting from HR mirror 8 and following the direction indicated by the arrows in FIGS. 1A and 1B. The beam enters the gain medium 4 through facet 20 at an angle of incidence $\theta_1$, where it makes a first pass through gain medium 4 at a refracted angle $\theta_2$ toward facet 21. The refracted angles are dictated by Snell's law, $n_1\theta_1 = n_2\theta_2$, where $n_1$ is the refractive index of the material in which the resonator 2 and gain medium 4 is placed (usually air), and $n_2$ is the refractive index of the gain medium 4. Assuming $n_1=1$ (for air), then $\theta_1=n_2\theta_2$.

The beam is then refracted out of the gain medium 4 through facet 21 at an angle thereto of $\theta_1$ (parallel to the input beam). Beam 30 is retro-reflected by prism 10. For each retro-reflection, the beam is folded 180° and laterally displaced from the incoming beam by two total internal reflections off of reflecting surfaces 16. The beam reenters gain medium 4 at an angle of incidence $\theta_1$, where it makes a second pass through gain medium 4 at a refracted angle $\theta_2$ toward adjacent facet 22. The beam strikes facet 22 above the critical angle, where it is totally internally reflected to strike face 20 at angle $\theta_2$, and refracted out thereby at an angle $\theta_1$. The beam is retro-reflected 180° by rooftop prism 11 toward rooftop prism 12, which retro-reflects the beam 180° toward facet 22. The beam reenters gain medium 4 through facet 22 at an angle $\theta_1$, where it makes a third pass through gain medium 4 at a refracted angle $\theta_2$ toward adjacent facet 20. The beam strikes facet 20 above the critical angle, where it is totally internally reflected to strike face 23 at angle $\theta_2$, and refracted out therethrough at an angle $\theta_1$. The beam is retro-reflected 180° by prism 13 and re-enters gain medium 4 through facet 23 at an angle of incidence $\theta_1$, where it makes a fourth pass through gain medium 4 at a refracted angle $\theta_2$ toward opposing facet 22. The beam is refracted out of the gain medium 4 through facet 22 at an angle thereto of $\theta_1$ and strikes OC mirror 18, where some of the light is transmitted therethrough as an output beam 34. The rest of the light is reflected back through the intracavity path described above in the opposite direction indicated by the arrows in FIGS. 1A/B. Apertures 32 and 33 can be placed in front of HR mirror 8 and OC mirror 18 respectfully, for controlling the mode quality of the beam 30.

The elements of cavity 2 and gain medium 4 are oriented so that $\theta_1$ is 45 degrees for all beam segments refracting into or out of gain medium 4. Thus, all light in the intracavity beam path inside the gain medium is refracted upon entry, or incident upon exiting, the facets 20–23 at $\theta_2$. Therefore all segments of beam 30 outside the gain medium 4 are either perpendicular or parallel to each other, which makes for simple alignment.

The compact and simple arrangement of the solid state laser 1 of the present invention has many advantages over other optically pumped lasers of the prior art. The intracavity beam passes through the gain medium four times during a single pass through the cavity, where the beam is amplified during each pass. Further, almost the entire gain medium 4 is excited by the laser diodes 6. Each of the four passes traverses a different region of gain medium 4, thereby extracting energy from these different regions to maximize the efficiency of the laser diode system 1. The multiple beam passes through the gain medium are achieved while incorporating an easy to align cavity configuration. The gain volume of gain medium 4 can be up to 10 times larger than other typical diode-pumped solid-state lasers, thus requiring less space with more output power. The cavity configuration minimizes or eliminates traditional thermal lens problems common with optically pumped solid state materials. Pumping through non-parallel multi-facet surfaces allows for excellent laser mode control and efficiency. There is no need for optical filters to remove the pump energy from the output laser beam. Pump sources 6 can be pulsed individually to dynamically change the pulse duration and, in principle, the repetition rate of the output beam. For example, two pump sources can operate at 1000 Hz, with the delay between the two pump sources set to correspond to a period of 500 microseconds, so that the net repetition rate is 2000 Hz.

The cavity configuration of the present invention allows for efficient cooling of the gain medium, the pump sources, and the cavity optics. All these elements lie in a single plane, and therefore can be mounted to a single heat sink surface that cools all the laser elements while maintaining the alignment of the cavity. Optically pumping the facets at substantially 90 degrees minimizes reflection losses.

Figure 2:
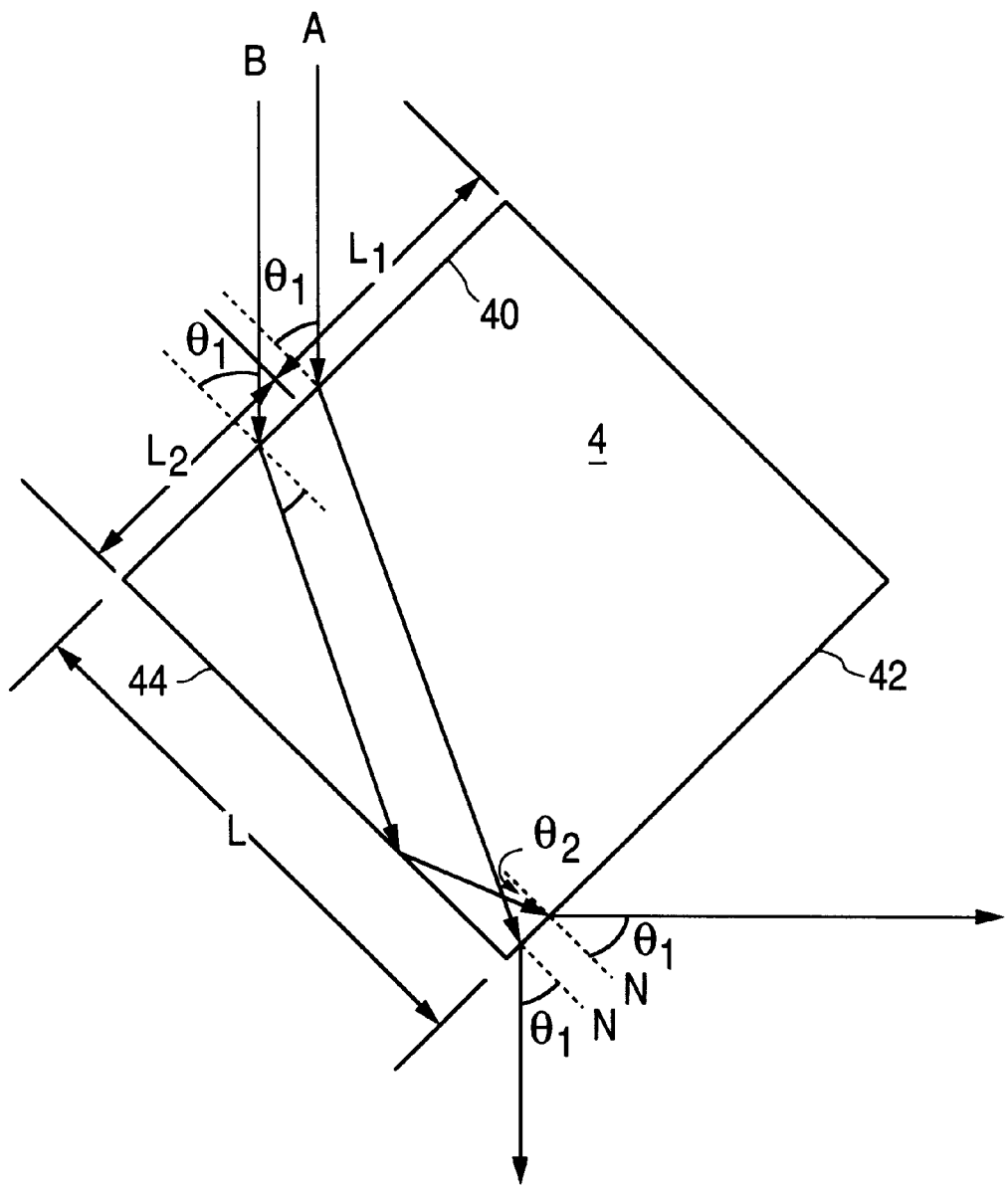
FIG. 2 is a top cross-sectional view of the gain medium, illustrating the two length portions of the gain medium.

Each facet has two length portions thereof, $L_1$ and $L_2$, as illustrated in FIG. 2, that dictates whether the light incident thereon at $\theta_1=45°$ is directly refracted out of the opposing facet in a direction parallel to the incident beam, or undergoes total internal reflection off of the adjacent facet first, and then is refracted out of the opposing facet in a direction perpendicular to the incident beam. For example, beams A and B in FIG. 2 are both incident upon facet 40 with an angle of incidence $\theta_1=45°$, and refracted through the cube shaped gain medium 4 at an angle $\theta_2$. Beams incident along length $L_1$ (such as beam A) will strike opposing facet 42 first, and be refracted out at 45° in a direction parallel to the incoming beam. However beams incident along length $L_2$ (such as beam B) will strike adjacent facet 44 first, reflect off of facet 44, and refract out facet 42 at 45° in a direction perpendicular to the incoming beam. $L_2$ is defined as:

$$L_2 = L_1 \tan(\theta_2) \quad (1)$$

During each half round trip through resonant cavity 2, beam 30 enters two facets in the $L_1$ length portion thereof, and two facets in the $L_2$ length portion thereof, and vice versa for the reverse half round trip. Retro-reflecting prisms 10 and 13 are used instead of simple mirrors because the beam needs to be displaced laterally so that the reflected beam will enter a different length portion $L_1$ or $L_2$ of the same facet from which it immediately originated. Likewise, prisms 11 and 12 are used instead of simple mirrors so that the beam segment between prisms 11 and 12 is laterally displaced so as to miss gain medium 4.

Figure 3:
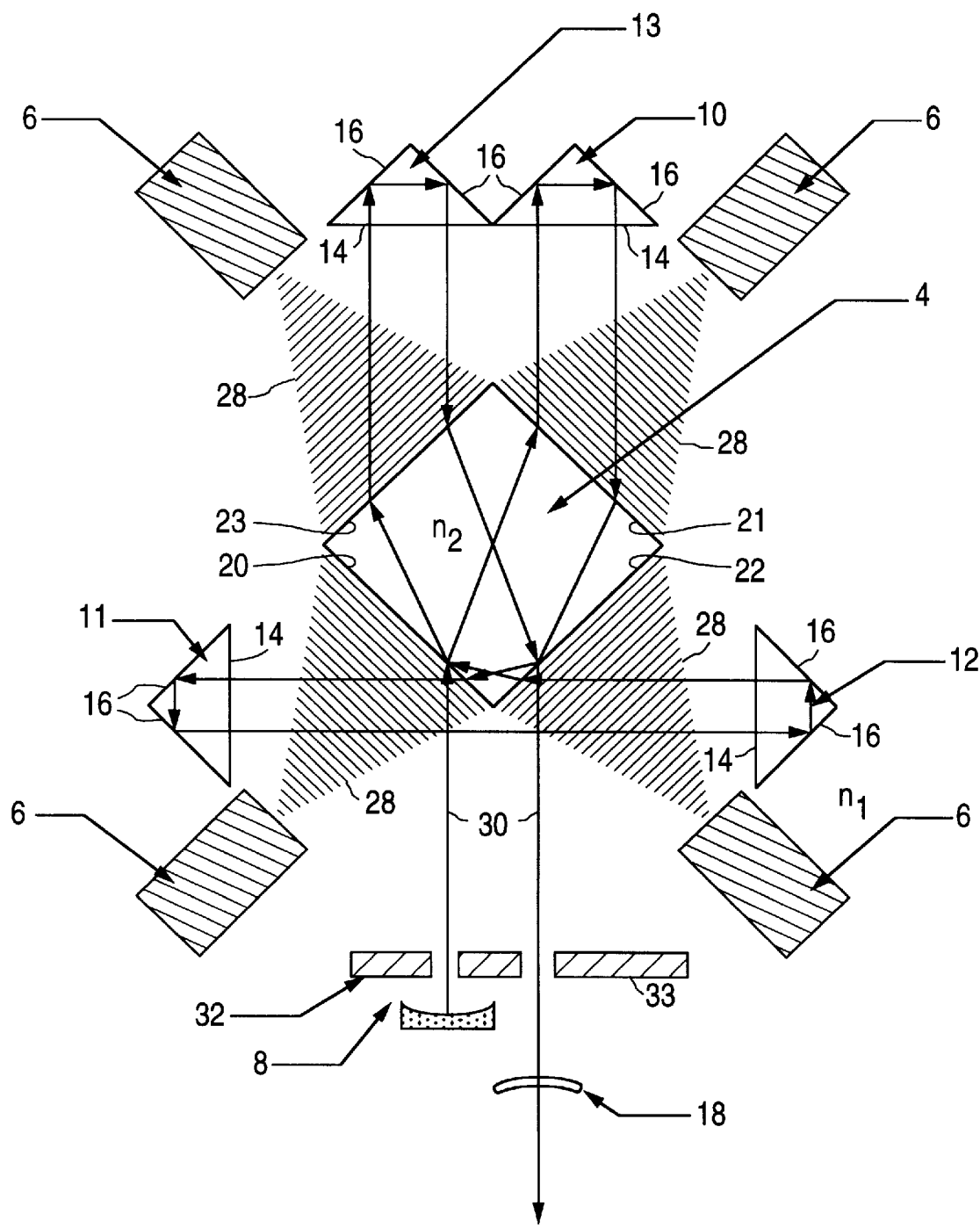
FIG. 3 is a top plan view of the solid state laser system with off-set optical mirrors.

For simple alignment, HR mirror 8 and OC mirror 18 can be combined into a single, co-planar optical element. Further, the resonant cavity 4 can be unstable, with HR mirror 8 distanced differently from the gain medium compared to OC mirror 18, as illustrated in FIG. 3.

Anamorphic optics such as lenses, fibers or mirrors can be used to properly shape and focus the laser diode pump source outputs 28 onto the facets for best efficiency. Alternately, the height and width of the gain medium can be matched to the anamorphic beam profile of the laser diodes for better efficiency by using the natural divergence of the laser diodes to evenly illuminate the facets 20–23.

Facets 20–23 ideally have antireflection coatings for both the pump source output and laser beam wavelengths. Prism entry faces 14 preferably have an antireflection coating for the laser beam wavelength(s).

Figure 4:
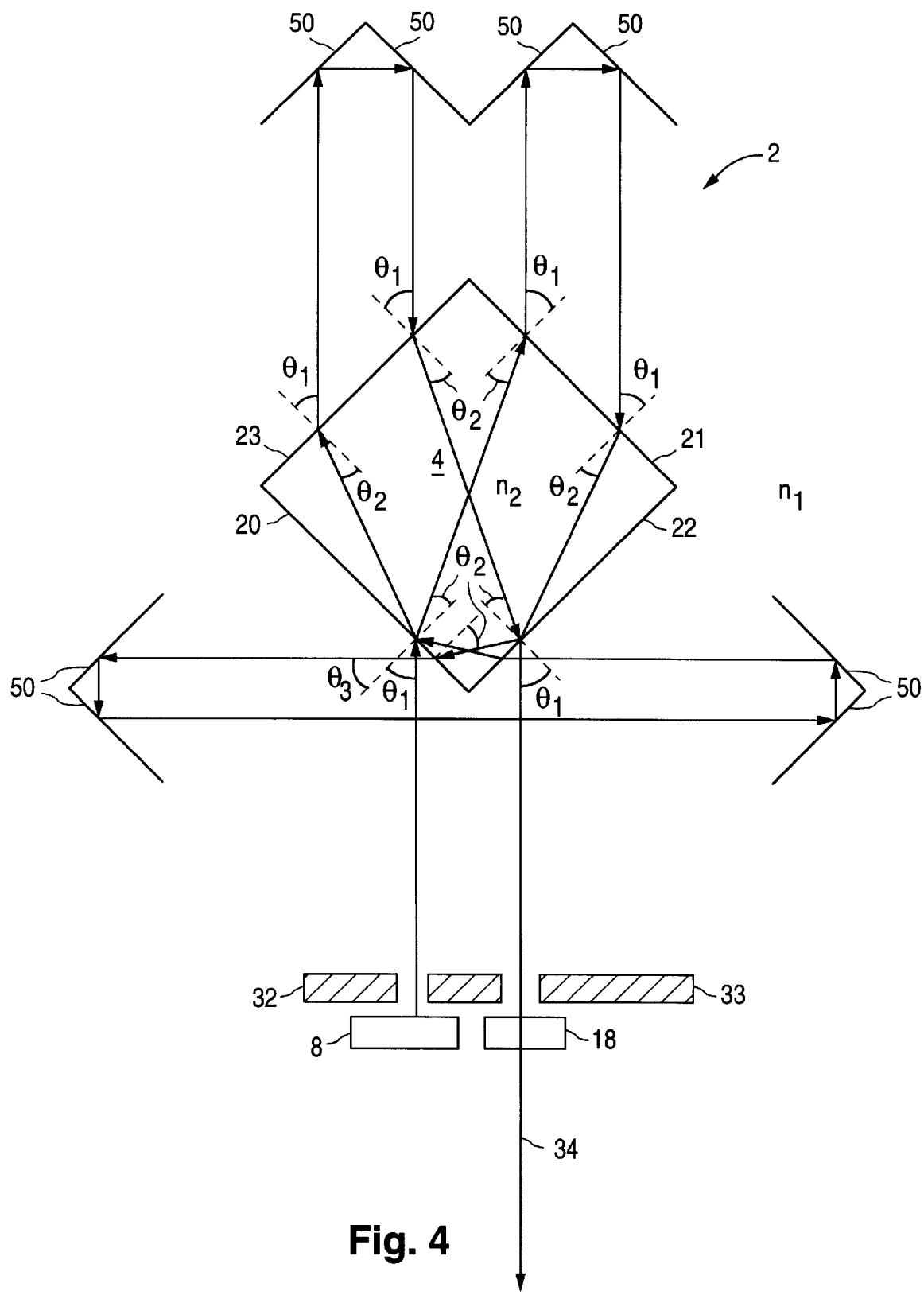
FIG. 4 is a top plan view of an alternate embodiment of the solid state laser system which utilizes retro-reflecting mirrors.

An alternate embodiment of the present invention is illustrated in FIG. 4, where pairs of folding mirrors 50 are used to retro-reflect the beam 180 degrees, instead of rooftop prisms 10–13. Each pair of mirrors 50, which can be attached together or separately mounted, are orthogonally oriented to fold the beam 180° while inducing the requisite lateral displacement of the beam.

Figure 5:
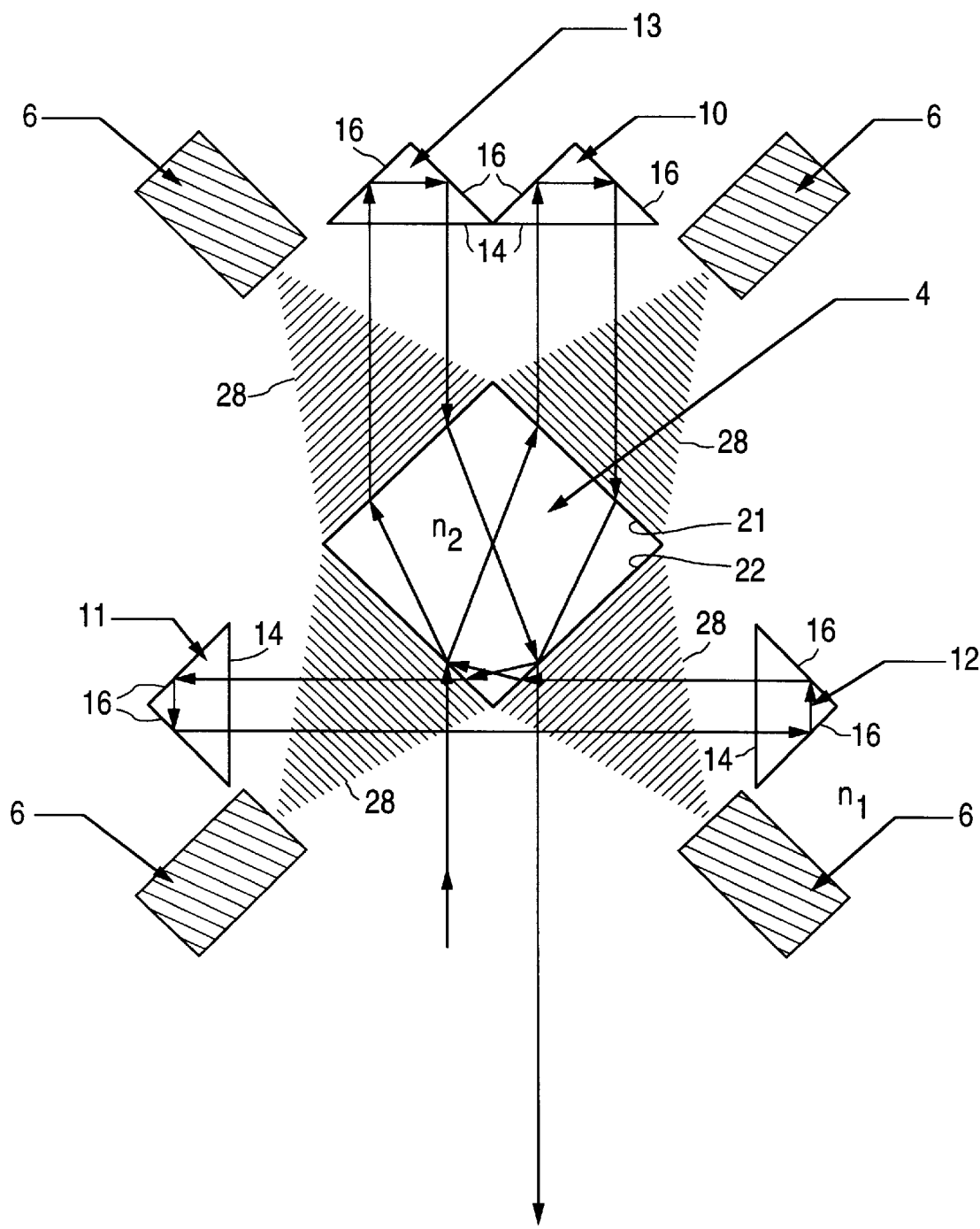
FIG. 5 is a top plan view of a second alternate embodiment of the solid state laser system which is used as a single pass amplifier.

Another alternate embodiment of the present invention is illustrated in FIG. 5, where the HR and OC mirrors 8/18 are removed, and light passes through cavity 2 only once. In this embodiment, cavity 2 and gain medium 4 are used as a single pass amplifier.

Figure 6:
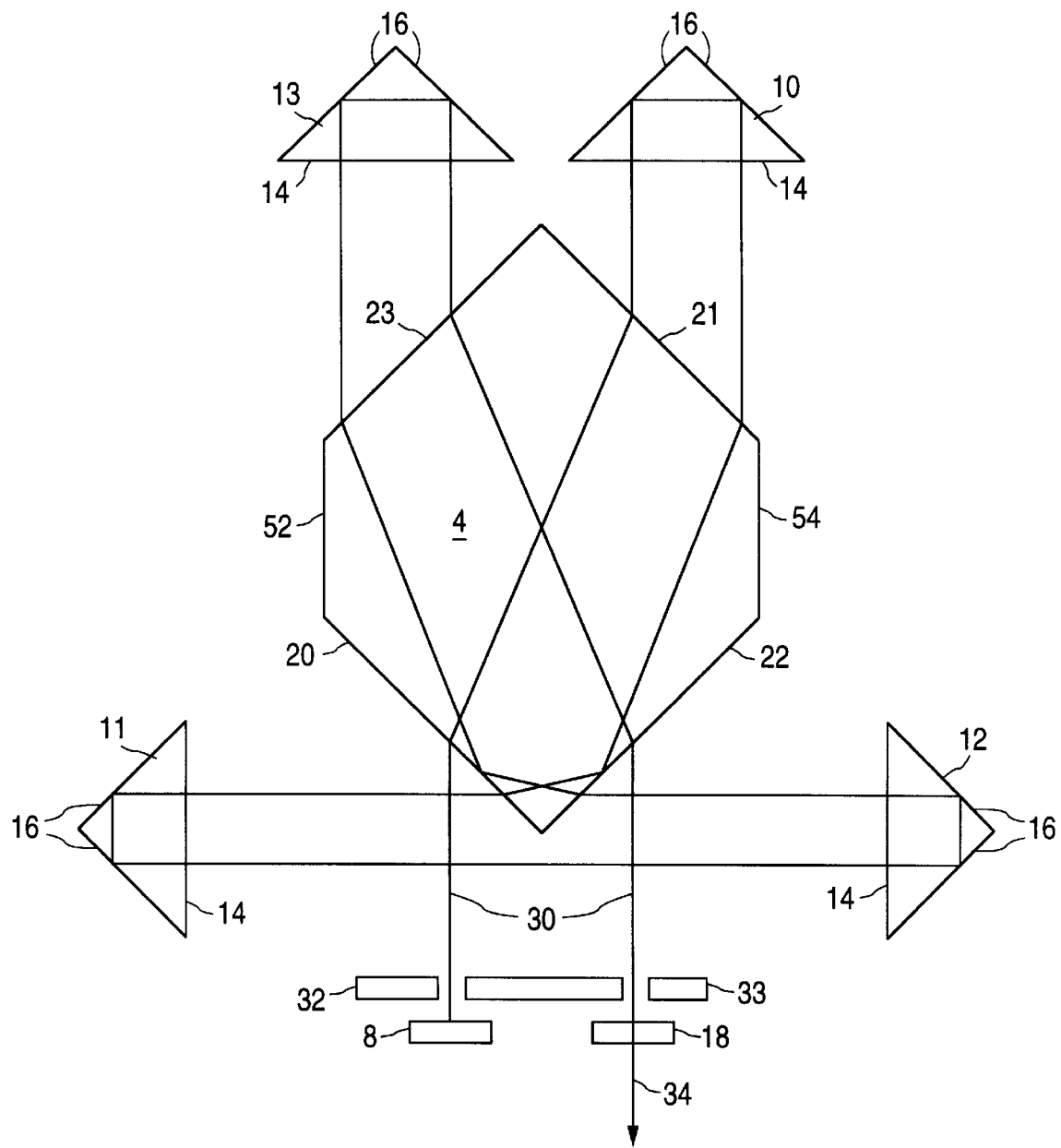
FIG. 6 is a top plan view of a third alternate embodiment of the solid state laser system which utilizes a hexagonal shaped gain medium.

The present invention is not limited to cube-shaped gain media. For example, the gain medium 4 can be hexagonal shaped, as illustrated in FIG. 6. The hexagonal shaped gain medium 4 has two additional facets 52/54 that can be optically pumped by two additional pump sources 6 for increased intracavity gain.

Figure 7:
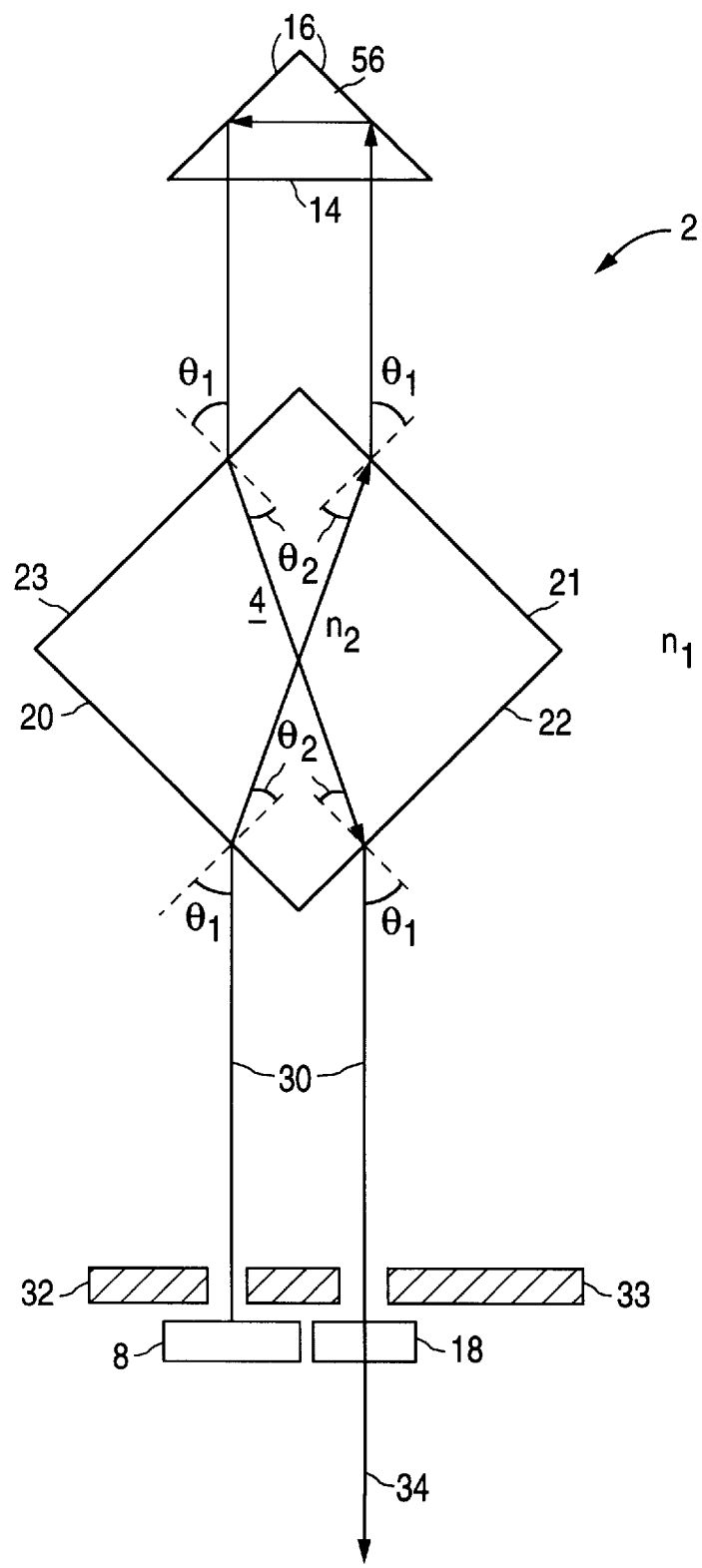
FIG. 7 is a top plan view of a fourth alternate embodiment of the solid state laser system which utilizes two passes through the gain during one trip through the resonant cavity.
Figure 8:
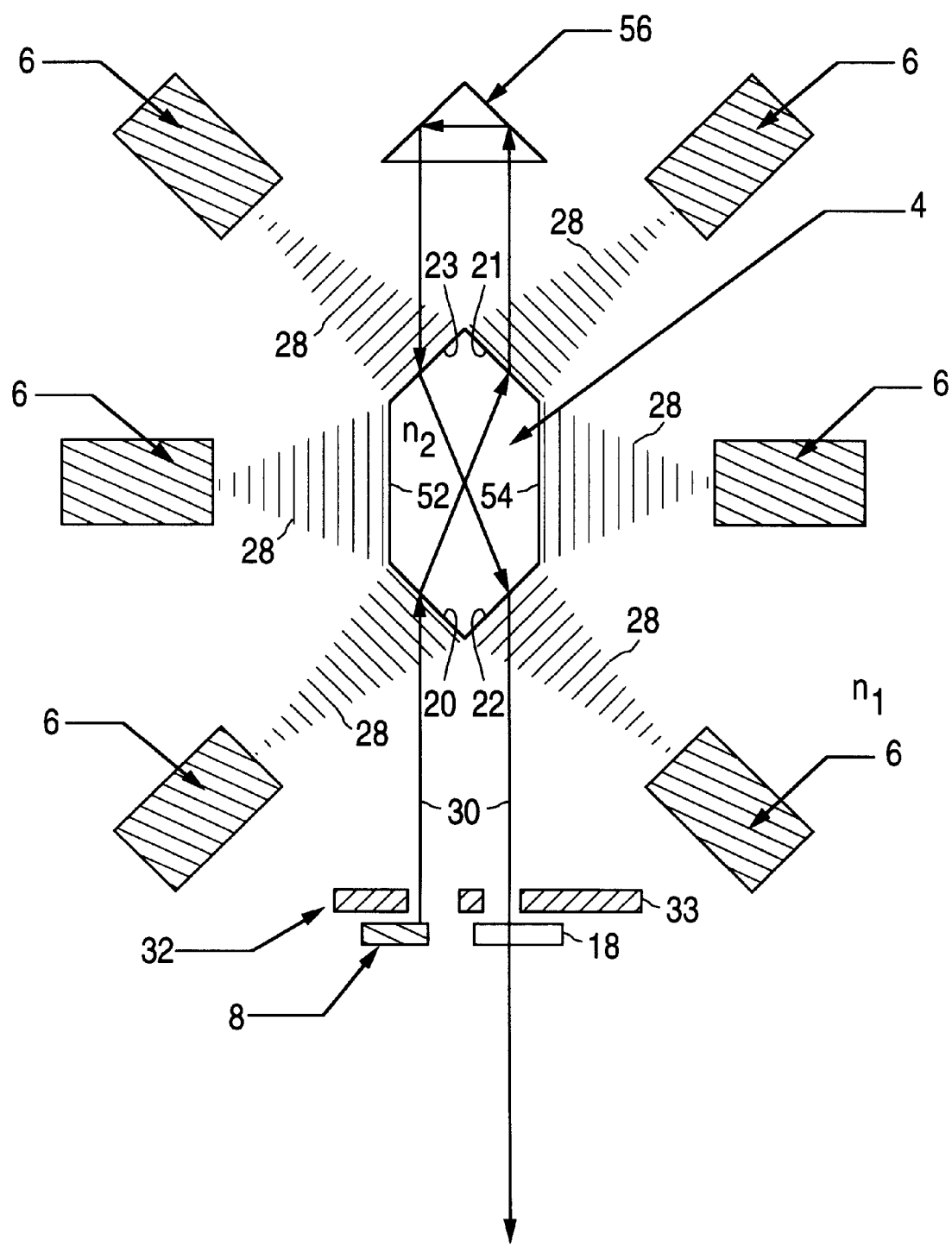
FIG. 8 is a top plan view of a fifth alternate embodiment of the solid state laser system which utilizes two passes through a hexagonal shaped gain during one trip through the resonant cavity.

FIGS. 7 and 8 illustrate an alternate configuration of cavity 2. This cavity configuration only uses a single retro-reflecting prism 56. The light path of this cavity is the same as the embodiment of FIGS. 1A/B, except the second and third passes through the gain medium 4 are eliminated.

It is to be understood that the present invention is not limited to the embodiments described above and illustrated herein, but encompasses any and all variations falling within the scope of the appended claims. For example, other facets, in addition to facets 52/54, can be added to gain medium for so that additional pump sources can be used to optically excite the gain medium.

What is claimed is:

1. A solid state laser system, comprising:
   a resonant cavity including a retro-reflecting optical element;
   a gain medium disposed in the resonant cavity and having at least a first and a second pair of opposing facets;
   a plurality of optical pump sources each producing an optical pump output that is incident upon one of the facets for exciting the gain medium to amplify an intracavity light beam that travels through the resonant cavity;
   wherein the resonant cavity and gain medium are oriented so that, during a single trip through the resonant cavity, the beam makes at least a first and a second pass through the gain medium, and wherein during the first pass, the beam enters and exits the gain medium through the first pair of opposing facets, and during the second pass the beam enters and exits the gain medium through the second pair of opposing facets.

2. The solid state laser system of claim 1, wherein the retro-reflecting optical element folds the beam 180° while laterally displacing the beam.

3. The solid state laser system of claim 2, wherein the retro-reflecting optical element is one of a rooftop prism and a pair of mirrors disposed orthogonally to each other.

4. The solid state laser system of claim 2, wherein the optical pump output from each optical pump source is incident upon the respective facet at a substantially normal angle of incidence.

5. The solid state laser system of claim 2, further comprising: an aperture disposed in the resonant cavity.

6. The solid state laser system of claim 2, wherein the beam enters and exits the gain medium through each of the facets at non-normal angles thereto.

7. The solid state laser system of claim 6, wherein the first pair of opposing facets are substantially parallel to each other, and the second pair of opposing facets are substantially parallel to each other.

8. The solid state laser system of claim 7, wherein the beam enters and exits the gain medium through each of the facets at an angle of substantially 45 degrees relative thereto.

9. The solid state laser system of claim 8, wherein all segments of the beam in the resonant cavity and outside of the gain medium are substantially parallel or perpendicular to each other.

10. The solid state laser system of claim 9, wherein the gain medium has a substantially square cross-section.

11. The solid state laser system of claim 9, wherein the gain medium has a hexagonal cross-section.

12. A solid state laser system, comprising:
   a resonant cavity defined by an output coupler, a high reflector, and a plurality of retro-reflecting optical elements;
   a gain medium disposed in the resonant cavity and having at least a first pair of facets that oppose each other and a second pair of facets that oppose each other;
   a plurality of optical pump sources each producing an optical pump output that is incident upon one of the facets for exciting the gain medium to generate an intracavity light beam that oscillates in the resonant cavity;
   wherein the resonant cavity and gain medium are oriented so that, during a single trip through the resonant cavity, the beam makes at least a first and a second pass through the gain medium, and wherein during the first pass, the beam passes directly through the gain medium by entering and exiting the gain medium through the first pair of facets, and wherein during the second pass, the beam passes non-directly through the gain medium by entering the gain medium through one of the facets, totally internally reflecting off a non-opposing facet to the one facet, and exiting the gain medium through an opposing facet to the one facet.

13. The solid state laser system of claim 12, wherein the beam exiting the gain medium after the first pass is re-directed by one of the plurality of retro-reflecting optical elements back toward the gain medium such that during the second pass the beam enters the gain medium through one of the first pair of facets, totally internally reflects off of one of the second pair of facets, and exits the gain medium through the other one of the first pair of facets.

14. The solid state laser system of claim 12, wherein during the single trip, the beam makes a third and a fourth pass through the gain medium, and wherein during the third pass the beam enters the gain medium through one of the second pair of facets, totally internally reflects off of one of the first pair of facets, and exits the gain medium through the other one of the second pair of facets, and wherein the beam exiting the gain medium after the third pass is re-directed by another one of the plurality of retro-reflecting optical elements back toward the gain medium such that during the fourth pass the beam enters and exits the gain medium through the second pair of facets.

15. The solid state laser system of claim 12, wherein each of the retro-reflecting optical elements folds the beam 180° while laterally displacing the beam.

16. The solid state laser system of claim 12, wherein the retro-reflecting optical elements are one of rooftop prisms and pairs of mirrors disposed orthogonally to each other.

17. The solid state laser system of claim 12, wherein the optical pump output from each optical pump source is incident upon the respective facet at a substantially normal angle of incidence.

18. The solid state laser system of claim 12, further comprising:
   an aperture disposed in the resonant cavity.

19. The solid state laser system of claim 12, wherein the beam enters and exits the gain medium through each of the facets at non-normal angles thereto.

20. The solid state laser system of claim 19, wherein the first pair of opposing facets are substantially parallel to each other, and the second pair of opposing facets are substantially parallel to each other.

21. The solid state laser system of claim 20, wherein the beam enters and exits the gain medium through each of the facets at an angle of substantially 45 degrees relative thereto.

22. The solid state laser system of claim 21, wherein the direction of the beam segment exiting the gain medium after the first pass is perpendicular to the direction of the beam segment exiting the gain medium after the second pass.

23. The solid state laser system of claim 22, wherein all segments of the beam inside the resonant cavity and outside of the gain medium are substantially parallel or perpendicular to each other.

24. The solid state laser system of claim 23, wherein the gain medium has a substantially square cross-section.

25. The solid state laser system of claim 23, wherein the gain medium has a hexagonal cross-section, and further includes a third pair of opposing facets through which optical pump outputs can pass to excite the gain medium.

26. A solid state laser system, comprising:
   a resonant cavity defined by an output coupler, a high reflector, and at least a first, second and third retro-reflecting optical elements;
   a gain medium disposed in the resonant cavity and having at least a first and a second facets that oppose each other and a third and fourth facets that oppose each other;
   a plurality of optical pump sources each producing an optical pump output that is incident upon one of the first, second, third and fourth facets for optically exciting the gain medium to generate an intracavity light beam that oscillates in the resonant cavity;
   wherein the resonant cavity and gain medium are oriented so that, during a single trip through the resonant cavity the beam enters the gain medium through the first facet, exits the gain medium through the second facet, is re-directed by the first retro-reflecting optical element back toward the second facet, re-enters the gain medium through the second facet, totally internally reflects off of the third facet, exits the gain medium through the first facet, is re-directed toward the third facet by at least the second retro-reflecting optical element, re-enters the gain medium through the third facet, totally internally reflects off of the first facet, exits the gain medium through the fourth facet, is re-directed toward the fourth facet by the third retro-reflecting optical element, re-enters the gain medium through the fourth facet, and exits the gain medium through the third facet.

27. The solid state laser system of claim 26, wherein each of the first, second and third retro-reflecting optical elements fold the beam 180° while laterally displacing the beam.

28. The solid state laser system of claim 27, wherein each of the first, second and third retro-reflecting optical elements is one of a rooftop prism and a pair of mirrors disposed orthogonally to each other.

29. The solid state laser system of claim 26, wherein the optical pump output from each optical pump source is incident upon the respective facet at a substantially normal angle of incidence.

30. The solid state laser system of claim 26, further comprising:

an aperture disposed in the resonant cavity.

31. The solid state laser system of claim 26, wherein the beam enters and exits the gain medium through each of the facets at non-normal angles thereto.

32. The solid state laser system of claim 31, wherein the first and second facets are substantially parallel to each other, and the third and fourth facets are substantially parallel to each other.

33. The solid state laser system of claim 32, wherein the beam enters and exits the gain medium through each of the facets at an angle of substantially 45 degrees relative thereto.

34. The solid state laser system of claim 33, wherein the direction of the beam segments between the second facet and the first retro-reflecting optical element is perpendicular to the direction of the beam segment between the first facet and the third retro-reflecting optical element.

35. The solid state laser system of claim 34, wherein all segments of the beam inside the resonant cavity and outside of the gain medium are substantially parallel or perpendicular to each other.

36. The solid state laser system of claim 35, wherein the gain medium has a substantially square cross-section.

37. The solid state laser system of claim 35, wherein the gain medium has a hexagonal cross-section, and further includes a fifth and sixth facets that oppose each other through which optical pump outputs can pass to excite the gain medium.

* * * * *